April 21, 1959
R. A. WATSON
2,883,014
SINGLE PEDAL OPERATED SYSTEMS FOR CONTROLLING
THE ACCELERATION AND DECELERATION OF VEHICLES
Filed Oct. 5, 1955
2 Sheets-Sheet 1
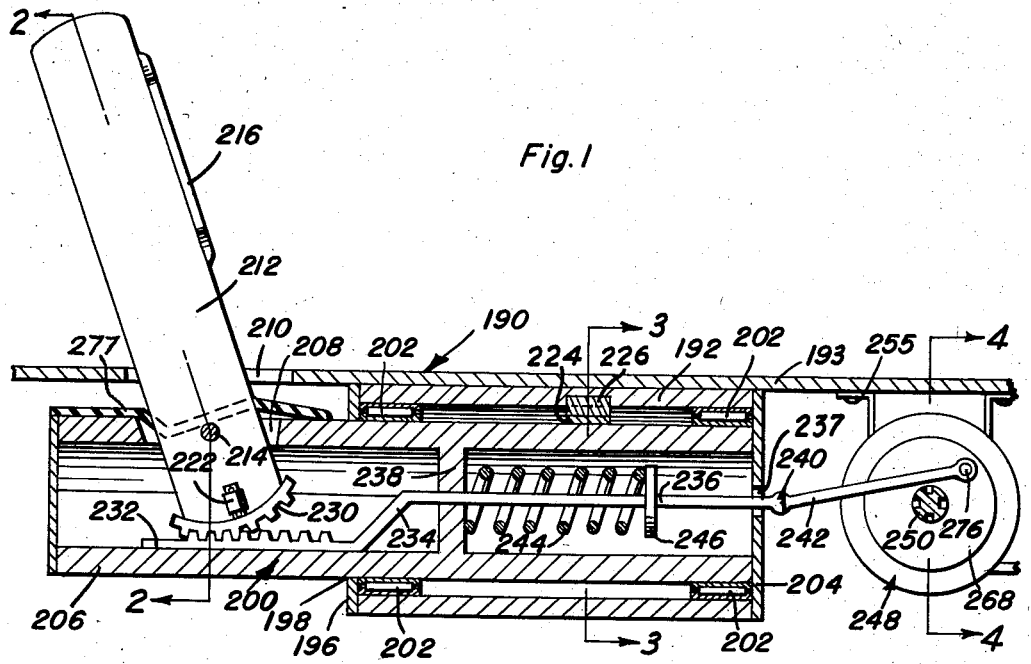
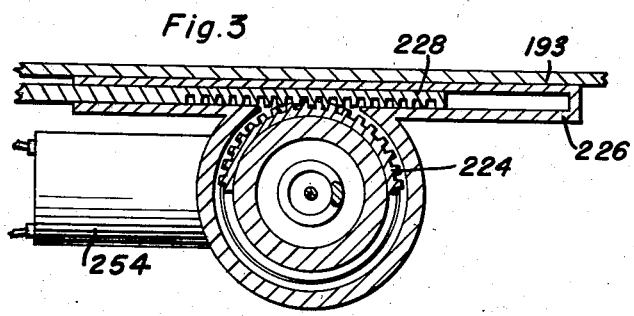
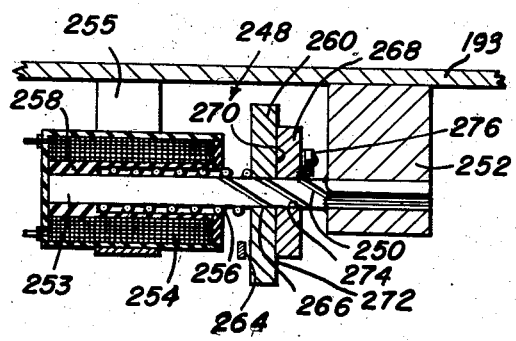
Richard A. Watson
INVENTOR
BY *Frank C. Maley*
AGENT

United States Patent Office 2,883,014
Patented Apr. 21, 1959

2,883,014

SINGLE PEDAL OPERATED SYSTEMS FOR CONTROLLING THE ACCELERATION AND DECELERATION OF VEHICLES

Richard A. Watson, Kitzbuhel, Austria

Application October 5, 1955, Serial No. 538,698

5 Claims. (Cl. 192—3)

This invention relates to improvements in single pedal operated systems for controlling the acceleration and deceleration of vehicles and is a continuation-in-part of my copending application Serial No. 467,030, filed November 5, 1954, now Patent No. 2,781,116, issued February 12, 1957.

A primary object of the present invention is to provide a very compact and integrated single pedal operated acceleration and deceleration system, whereby a dependable, safe and efficient complete operation of any type of vehicle is ensured.

Another important object of this invention is to provide a novel means for structurally and functionally associating a master brake cylinder with a single pedal operated system and to provide a novel means for actuating a fuel/air metering control means for the prime mover of the vehicle by means of an angular movement of the single pedal.

A further important object of this invention is to provide a control means for the fuel or air flow metering device (such as a carburetor) or power flow device to ensure proper engine speed idling or operation irrespective of pedal pressure, during the application of the brakes.

A still further object of this invention is to provide a single pedal operated acceleration and deceleration system for a vehicle, powered by an internal combustion or diesel engine, and to provide means for mounting a single control pedal in any desired convenient position for easy operation by an operator.

A still further object of this invention is to provide a compact, easily installed and inexpensively maintained and simply operated single pedal operated acceleration and deceleration system for a vehicle.

The foregoing and ancillary objects are attained by this invention, a preferred embodiment of which is set forth in the following description and illustrated in the attached drawings, wherein:

Fig. 1 is a vertical transverse sectional view of a form of single pedal operated vehicle accelerator and brake control system, illustrating a novel type of mounting structure and operating means for the actuating cylinder of the fuel and/or air control means and a novel type of electrical controller operated by the brake operating means;

Fig. 2 is a detailed vertical longitudinal view of the pedal mounting and attaching means and is taken on line 2—2 of Fig. 1;

Fig. 3 is a cross-sectional view taken on line 3—3 of Fig. 1 and showing the connection between the actuating cylinder and the brake means (not shown);

Fig. 4 is a vertical longitudinal sectional view of the fuel or air flow controller;

Figure 5:
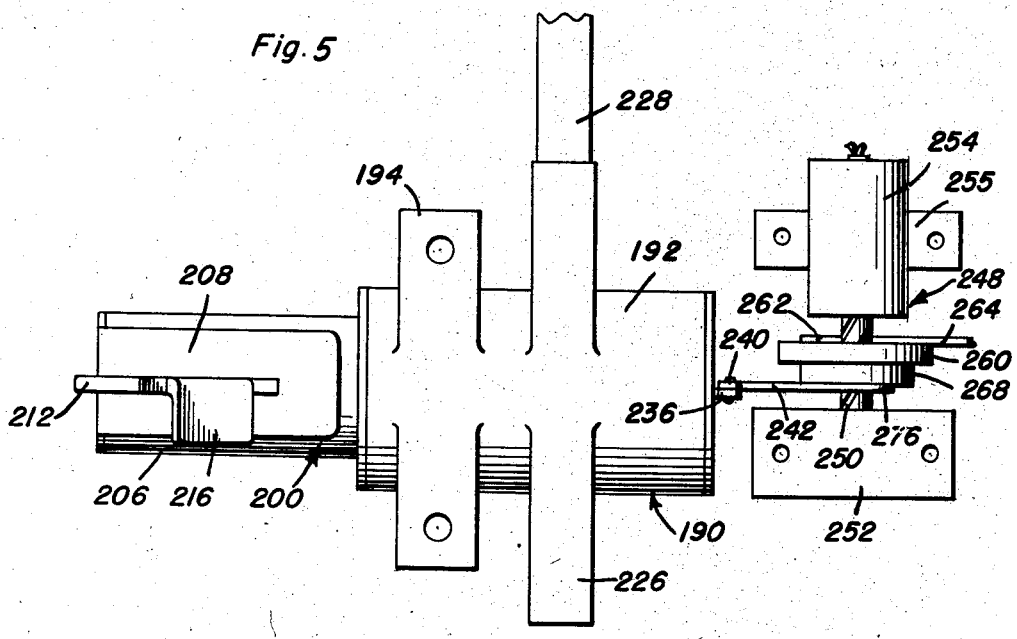
Fig. 5 is a top plan view of the system of Fig. 1.

Referring now to the drawings in detail the system, generally designated by the numeral 190, includes a cylindrical housing 192, which is secured by straps 194 to the underside of the floorboard 193 of a vehicle. The straps 194 extend forwardly and rearwardly from the top of the housing and mount the housing in a position transversely of the longitudinal axis of the vehicle. The housing has an end wall 196 formed with an opening 198 to accommodate an actuating cylinder 200. The cylinder 200 is rotatably disposed within the housing by means of bearings 202, which are held in place by the end wall 196 and the opposite end wall 204 and which may be roller, needle, ball or ordinary friction bearings.

The cylinder 200 has an extending end 206, which has an axially extending, radial slot 208 formed in its upper wall and vertically aligned with a vertical slot 210 formed transversely in the floorboard and being of a longer length than the slot 208. A flat pedal 212 is vertically (or substantially vertically, dependant upon the plane of the floorboard) positioned in the aligned openings and is pivoted on a pivot pin 214 (Fig. 2) which is disposed transversely of the long axis of the cylinder 200. The pedal is mounted by the pivot pin 214 for pivotal curvilinear movement about an axis paralleling the longitudinal axis of the vehicle or about an axis transverse to the long axis of the cylinder 200. The pedal 212 is formed, adjacent its upper end above the floorboard, with an integral plate or flange 216, that extends rearwardly from a side edge of the pedal and is provided to enable the operator's foot to produce a swinging movement of the pedal about the pivot 214. A flexible cover 277, which may be formed from rubber or plastic or the like material, is fixedly fitted on the cylinder over the slot 208 to cover the slot and embrace the pedal so as to prevent dirt and the like from entering the cylinder. The cylinder 200 is formed at the interior of its bottom wall (see Fig. 2) below the slot 208 with an axially extending throat 218, which may be integral or otherwise provided on the inner wall of the cylinder. The throat 218 provides parallel, axially extending, flat guide walls 220 which confront the opposing flat faces of the lower end of the pedal. The faces of the lower end carry axially extending and laterally protruding tapered roller or needle bearings 222, which engage the guide walls 220 to ensure friction free pivotal movement of the pedal.

The pedal is moved, by foot pressure, normal to its pivot axis, to produce a rotational movement of the actuating cylinder 200, which rotates in the housing 192. To accommodate the forward and rearward movement of the pedal (with respect to the longitudinal axis of the vehicle), the slot 210 is enlarged longitudinally of the vehicle. The cylinder 200 is formed with an arcuate gear section 224 that extends semi-circumferentially of the peripheral surface of the cylinder. An elongated tubular housing section 226, of rectangular cross-section, houses a sliding rack bar 228, which is enmeshed with the gear section 224. The housing section 224 is formed integral with the housing 192 and is disposed tangentially to the upper portion thereof. The rack bar is attached to the standard piston rod of the conventional master brake cylinder and reciprocates the piston rod to operate the brakes.

The lower end of the pedal 212 terminates in a segmental gear section 230, which is enmeshed with a rack bar section 232 of a slide operating rod 234. The rack bar section 232 is slidably disposed on the bottom of the cylinder. The rod 234 has a section 236, which is axially offset from the section 232 and which is slidably supported by a transverse partition 238. The end of section 236 projects through an opening 237 the end wall 204 and is connected by a universal joint 240 to a link 242. A spring 244 is coiled on the section 236 and bears against the partition 238 and against a stop 246 formed on the section 236, the spring returning the slide rod and the pedal to an inoperative position, when pressure is released from the side plate 216, Automatic fuel controller means, generally indicated at 248 is provided in association with the slide rod 234, which operates the fuel/air metering device or carburetor (not shown). Such controller means 248 (Figs. 1, 4 and 5) includes a helically grooved shaft 250, which has one end set in a bracket 252 that depends from the floorboard (or may be otherwise fixedly mounted) and which fixedly carries the shaft 250. One end 253 of the shaft has an electromagnet 254 circumposed thereon. The electromagnet is preferably of cylindrical shape and is supported by a strap 255. A helical spring 256 is circumposed on the shaft, within the electromagnet, and has one end bearing against a shoulder 258 and the other against a side of a disc 260. The disc 260 is formed of any suitable material which is responsive to the force of the electromagnet and has a lateral lug 262 on its outer side. The lug 262 receives a connection 264 (see Fig. 5) which extends directly or in seriatim to the fuel metering arm (not shown) of a carburetor or fuel or air metering device. The disc 260 is formed with a helically threaded central aperture 266, the threads of which complement grooves on the shaft 250. The disc is rotatably mounted by the helical threads on the shaft and such rotational motion produces a movement of the disc axially of the shaft. A disc 268 is also mounted on the shaft and has a flat face 270 which confronts and is frictionally engageable with the flat face 272 on the disc 260. The disc 268 is formed from non-magnetic material, so that it cannot respond to the attractive force of the electromagnet and is formed with a centrally disposed helically threaded aperture 274 so that it rotates and moves along the long axis of the shaft relative to the disc 260. The disc 268 is provided on its outer face with a lateral lug 276 which is attached to the link 242, either directly, as shown, or through an ancillary linkage system.

The shaft and the discs are so threaded that a quarter turn of either disc along the surface of the shaft will result in transmitting to the carburetor or fuel metering device (or to a control metering air intake to the engine, in such cases where fuel injection is utilized), the amount of control comprised between engine idling position and full throttle, or vice-versa.

In use, an operator will accelerate by applying a sidewise pressure to the plate 216 of the pedal 212. Such action will cause the segmental gear 230 to reciprocate the slide rod 234 and pull the rod 234 inwardly (to the left of Fig. 1). The disc 268 will be rotated by the reciprocal movement of the rod 234 and the surfaces 270 and 272 of the discs will lock in a clutch action so that the disc 260 will be rotated and will, in turn, actuate the connection 264.

In considering the action of the controller means 248, it is assumed, for example, that a vehicle, equipped with the system, is traveling at 50 m.p.h. and it is desired to brake the vehicle. Under such conditions, the driver presses forward on the pedal 212 and the cylinder 200 is rotated. Such rotational action of the cylinder produces, through the gear section 224 and rack bar 228 an actuation of the master brake cylinder. With such braking action (no lateral pedal movement having occurred), a suitable conventional switch (not shown) associated with the master brake cylinder causes the electromagnet 254 to be energized. The electromagnet is electrically connected through the switch with the electrical supply circuit of the vehicle. Energization of the electromagnet produces a retraction of the disc 260, which is drawn toward the electromagnet against the pressure of the spring 256 and moves the connection 264 for the carburetor, fuel or air metering device.

As soon as pressure is released on the brake, the electromagnet is no longer energized and the spring 256 will force the disc 260 back along the shaft 250, as far as it will go until it abuts the disc 268, in whichever position the latter disc happens to be in.

While an illustrative form of single pedal system, accelerator and decelerator connection, and controller has been herein shown and described, it is to be understood that such modification, arrangements and substitutions may be made as come within the scope of the invention, defined by the appended claims.

I claim:

1. A single pedal operated accelerating and decelerating structure for a vehicle having an engine provided with a fuel feed control means and having a hydraulic brake system which includes a master brake cylinder; said structure comprising a housing, means mounting the housing transversely of the longitudinal axis of a vehicle, an actuating cylinder mounted longitudinally of said housing for rotation in the housing, a single pedal, means mounting the pedal to the actuating cylinder for pivotal movement about an axis transverse to the axis of rotation of the actuating cylinder and for effecting rotational movement of the actuating cylinder upon movement of the pedal forwardly and rearwardly of the vehicle, lateral means on the pedal for receiving lateral foot pressure to pivot the pedal about its axis, connecting means axially moveable in the housing and engaged by the pedal, means attached to said connecting means adapted to actuate the fuel feed contol means and means connected to the actuating cylinder adapted to operate a master brake cylinder and electro-mechanical means automatically actuated by the application of hydraulic pressure in the master brake cylinder for operating the fluid fuel metering means, during the actuation of the master brake cylinder, so as to decrease such fuel metering means to reduce the engine to an idling speed and maintain the engine at such speed until the brakes are released upon rotation of said actuating cylinder.

2. A structure as claimed in claim 1 wherein said means attached to the connecting means includes a fixed helically grooved shaft, a first disc having a helically threaded control operator, the threads of which complement the grooves of said shaft mounted on the shaft for movement along the axis thereof and to which the connecting means is attached for moving the disc having a helically threaded control operator, the threads of which complement the grooves of said shaft, a second disc mounted on the shaft for movement along the axis thereof and to which the fuel feed control means is adapted to be attached, said discs having confronting frictionally engageable faces to form a clutch connection.

3. A structure as claimed in claim 2, wherein an electromagnet is provided in proximity to the second disc, said latter disc being formed of magnetically attractive material and being moved by the electromagnet out of engagement of the first disc and in a direction adapted to close off the fuel feed control means to an engine idling point and means adapted to be actuated by the operation of the master brake cylinder for energizing said electromagnet.

4. A structure as claimed in claim 1, wherein said means adapted to operate a master brake cylinder includes an axially reciprocating rod adapted to be connected to the piston rod of the master brake cylinder and slidably mounted in the housing tangentially to the actuating cylinder and having teeth on its portion within the housing and gear means circumposed on the actuating cylinder and enmeshed with the teeth on the rod to slide the rod as the actuating cylinder rotates.

5. A structure as claimed in claim 1, wherein said connecting means includes an elongated member longitudinally slidable in the actuating cylinder and having a rack bar provided thereon and a segmental cog on the lower end of the pedal enmeshed with the rack bar.

(References on following page)

References Cited in the file of this patent

UNITED STATES PATENTS

| | | |
|---|---|---|
| 1,718,884 | Thorpe | June 25, 1929 |
| 2,020,440 | Stein | Nov. 12, 1935 |
| 2,181,883 | Gibson | Dec. 5, 1939 |
| 2,311,120 | Mossinghoff | Feb. 16, 1943 |
| 2,423,006 | Chambers | June 24, 1947 |
| 2,453,054 | Whiffen | Nov. 2, 1948 |
| 2,707,036 | Hollub | Apr. 26, 1955 |

FOREIGN PATENTS

| | | |
|---|---|---|
| 401,387 | Great Britain | Nov. 16, 1933 |